Aug. 14, 1945.　　W. G. CHARLEY　　2,382,001
AGRICULTURAL IMPLEMENT
Filed Aug. 15, 1941　　3 Sheets-Sheet 1

Patented Aug. 14, 1945

2,382,001

UNITED STATES PATENT OFFICE 2,382,001

AGRICULTURAL IMPLEMENT

Walter G. Charley, La Crescent, Minn., assignor to Allis-Chalmers Manufacturing Company, Milwaukee, Wis., a corporation of Delaware Application August 15, 1941, Serial No. 407,031

13 Claims. (Cl. 97—47)

The invention relates to agricultural machines for field operations, such as soil tilling, in which a tool or implement is mounted on a traveling support and advanced in a working position by movement of the traveling support. Provisions for accommodating an operator on the mentioned type of machines usually comprise a seat on the traveling support, and if the tool or implement is of such nature as to require observation by the operator during progress of the machine, it is desirable that the operator's field of vision be obstructed as little as possible by the draft structure for the tool or implement.

It is an object of the invention to provide an improved implement mounting arrangement which provides for applying draft from a tractor or the like to the implement and supporting the implement in adjustable position with respect to the ground, and at the same time affords a clear field of vision for the tractor operator, and more particularly an implement mounting arrangement of this character which affords substantial ground clearance so that the machine may be used for cultivating standing crops of substantial height, such as knee-high corn.

Another object of the invention is to provide an improved self-propelled agricultural machine of the type comprising a tractor, ground working tools, a pair of relatively spaced cross-members extending laterally from a portion of the tractor in advance of its rear axle structure and operator's seat, and operative connections between the cross-members and the tools for carrying the tools on the tractor in vertically adjustable relation thereto, and wherein the detrimental effect of the relative spacing of the cross-members upon visibility of the ground from the operator's seat is substantially eliminated.

The improved implement mounting arrangement, as contemplated by a preferred form of the invention, is of substantial width, transversely of its length, and it is secured to the traveling support in a position so as to extend, in the direction of its length, transversely of said support, and in the direction of its width in a forwardly and downwardly inclined plane, the inclination of said plane relative to the horizontal being such that an operator occupying a normal upright position on the seat may view the draft structure on a line of vision substantially coinciding with said plane. The relatively large width of the draft structure permits considerable stiffness to be incorporated therein for a given thickness and in order to minimize obstruction of the driver's field of vision by the draft structure that thickness is kept as small as possible. The width of the draft structure is eliminated, or substantially eliminated, as a view obstructing factor due to the mentioned forward and downward inclination of the draft structure.

A series of brackets for transmitting draft from the draft structure to a series of implement units are preferably mounted on the inclined draft structure in depending positions, the brackets being spaced from each other longitudinally of the draft structure and each having a forward and a rearward connection with the draft structure. Due to the relatively large width of the draft structure the forward and rearward connections of the brackets may be spaced a substantial distance from each other, affording a secure mounting of the brackets on the draft structure, which is not liable to yield or fail under severe operating conditions. The forward and rearward connections may conveniently be made by means of ordinary screw bolts, which take up very little space in the operator's field of vision, and provisions may also be made conveniently for adjusting the brackets longitudinally of the draft structure. For that purpose a plurality of holes are preferably provided in the draft structure for selectively moving the bolts and brackets from one position to another longitudinally of the draft structure. In order to double the number of possible adjustments of each bracket for a given number of holes in the draft structure, two holes for each bolt may be provided in each bracket affording a vernier adjustment for each bracket.

The inclined draft structure, as contemplated by the invention, is adapted for use on tractors, and it is a further object of the invention to provide an improved adjusting mechanism for implement units mounted on the inclined draft structure, when applied to a tractor. The improved adjusting mechanism comprises a pair of links, one pivoted above the other on a depending bracket of the draft structure, and an actuating arm on the lower link which may be rocked back and forth by an actuating rod extending from an elevated point in proximity of the operator's seat at the rear of the tractor forwardly and under the inclined draft structure at a forward portion of the tractor. This arrangement further tends to clear the operator's field of vision.

Another object of the invention is to provide an improved tool or implement suspension affording up and down movement of the tool or implement relative to the traveling support, and stabilizing the tool or implement in its working position. The improved suspension, as contemplated by the invention, comprises a stationary frame member on the traveling support, a movable frame member rigidly connected with a support for the implement or tool, and a pair of upper and lower links connecting the movable frame member with the stationary frame member for up and down movement relative thereto. The stationary frame member has a pair of alined bearing elements spaced from each other a substantial distance transversely of the traveling support, on which the upper link is pivotally supported for up and down movement, but securely guided in a vertical plane relative to the stationary frame member. Another pair of alined bearing elements, below the first pair, for pivotally supporting the lower link on the stationary frame member are likewise spaced a substantial distance from each other for guiding the lower link securely in a vertical plane relative to the stationary frame member. The movable frame member, like the stationary frame member, has an upper pair of axially alined bearing elements for pivotally supporting the upper link on the movable frame member, and a lower pair of axially alined bearing elements for pivotally supporting the lower link on the movable frame member, the upper bearing elements being spaced a substantial distance from each other, transversely of the traveling support, for guiding the upper link securely in a vertical plane relative to the movable frame element, and the lower bearing elements being likewise spaced a substantial distance from each other, transversely of the traveling support, for guiding the lower link securely in a vertical plane relative to the movable frame member.

These and other objects and advantages of the invention will be more fully apparent from the following description of a preferred embodiment of the invention shown in the accompanying drawings. Referring to the drawings in which like reference characters designate the same or similar parts in the various views.

The tractor shown in the drawings is a tricycle type tractor having widely spaced rear wheels 1 and 2 and a pair of closely spaced front wheels 3 and 4 centrally ahead of the rear wheels 1 and 2. An upwardly arched rear axle structure on which the rear wheels are mounted comprises a central gear casing 6 and side arms 7 and 8 having outer housing portions 7' and 8' depending at the outer ends of the side arms and enclosing final drive gears for the rear wheels 1 and 2. Secured to the gear casing 6 at the forward side of the rear axle structure is a torque tube casing 9 which has an elongated relatively narrow portion extending longitudinally of the tractor and terminating at the forward end of the torque tube casing in a rearwardly tapering bell housing having mounting pads 11 at opposite sides of the tractor. An internal combustion engine 12 is rigidly secured to the torque tube casing 9, at the forward end of the bell housing, and a bracket 13 secured to the forward end of the engine 12 is supportingly connected with a pedestal 14 on which the front wheels 3 and 4 are mounted. An operator's seat at the rear of the tractor comprises a seat cushion 16 supported by longitudinal frame bars 17 and 18 secured intermediate their ends to the side arms 7 and 8 of the rear axle structure and connected together at their forward ends by a cross-bar 19 mounted on and extending transversely of the torque tube casing 9. The operator's seat also includes a backrest 21 which is supported on the support for the seat cushion at a suitable distance above the seat cushion. A steering wheel 22 within reach of an operator seated on the cushion 16 is operatively connected with the front wheels 3 and 4 by a steering mechanism including a reach rod 23 at the left side of the tractor. The reach rod is arranged in an elevated position relative to the mounting pad 11 at the left side of the tractor and relative to the bracket 13 so as to leave an unobstructed space for mounting an implement attachment on the tractor below the reach rod. The torque tube casing 9 and the engine 12 may be considered as constituting the body of the tractor, and front and rear supports for said body are afforded by the front steering truck including the pedestal 14, and by the rear assembly including the central gear casing 6 and side arms 7 and 8 of the rear axle structure.

Figure 2:
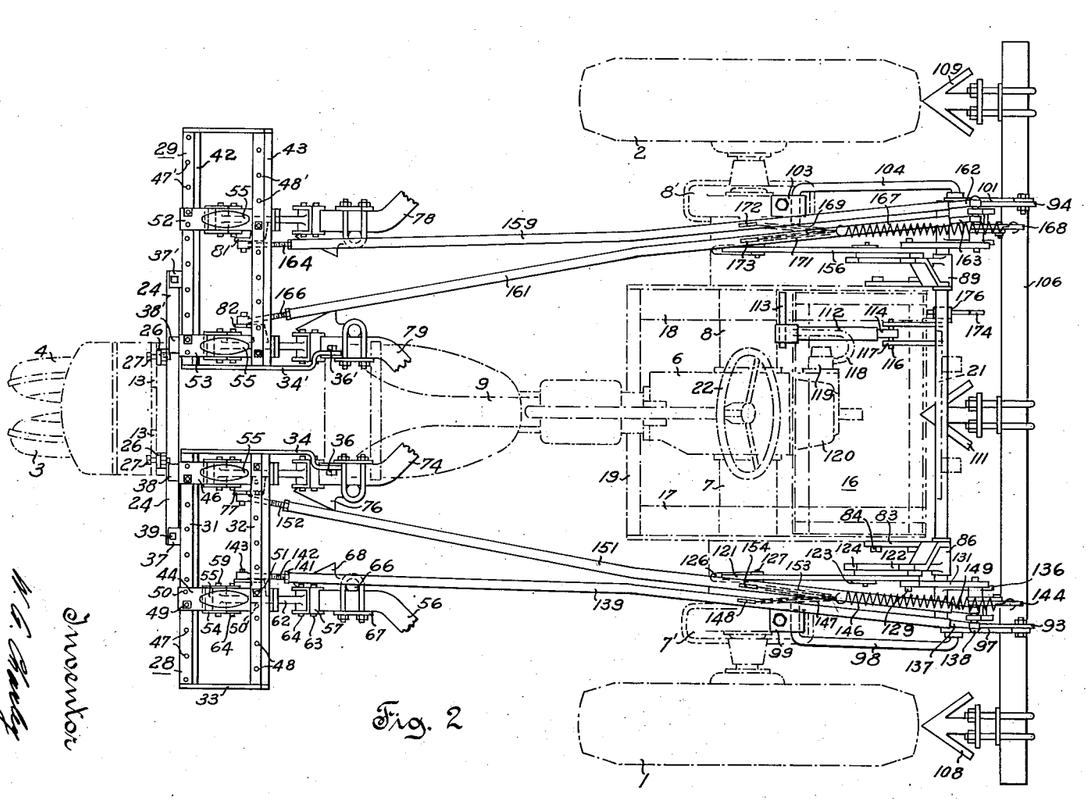
Fig. 2 is a top view of the machine shown in Fig. 1.

Referring to Fig. 2, a square cross-bar 24, which will be referred to as an outrigger bar, extends transversely of the tractor below the engine 12 and is rigidly secured to the bracket 13 by a pair of hangers 26, the hangers being detachably secured to the bracket 13 by bolts 27.

The outer end of the cross-bar 24 at the left side of the tractor has a tapped hole for the reception of a cap screw 39, and the other end of the cross-bar 24, at the right side of the tractor, has another tapped hole for the reception of another cap screw corresponding to the cap screw 39. A pair of attachment frames for mounting implements at opposite sides of the tractor are generally indicated at 28 and 29, and are of substantially identical construction. Referring to the attachment frame 28 at the left side of the tractor, a square tubular bar 31, to be referred to as a forward bar or front cross-bar, has an inner end, in rear of the bar 24, adjacent to the engine 12 and extends parallel to the bar 24 beyond the outer end of the latter at the left side of the tractor. An angle clip 37, rigidly secured to the bar 31 intermediate its ends, has a forwardly extending leg overlying the outer end of the bar 24, and the clip 37 is connected with the bar 24 by the mentioned bolt 39, the clip having a suitable hole in its forwardly extending leg for the reception of the bolt 39. A U-clip 38 having an upper flange overlying the bar 24, a lower flange underlying the bar 24 and a web in rear of the bar 24 is rigidly secured to the bar 31 at the inner end of the latter adjacent to the engine 12, the upper and lower flanges of the U-clip being spaced a suitable distance from each other so that the U-clip may readily be slid upon the bar 31 but with slight clearance only, so that the clip 38, and therefore of the inner end of the bar 31, will have very little or no vertical play relative to the bar 24. It will be noted that the described mounting of the forward bar 31 on the tractor by means of the cross-bar 24 and associated parts provides a cantilever connection between the forward bar 31 and a forward portion of the tractor.

Figures 1, 5:
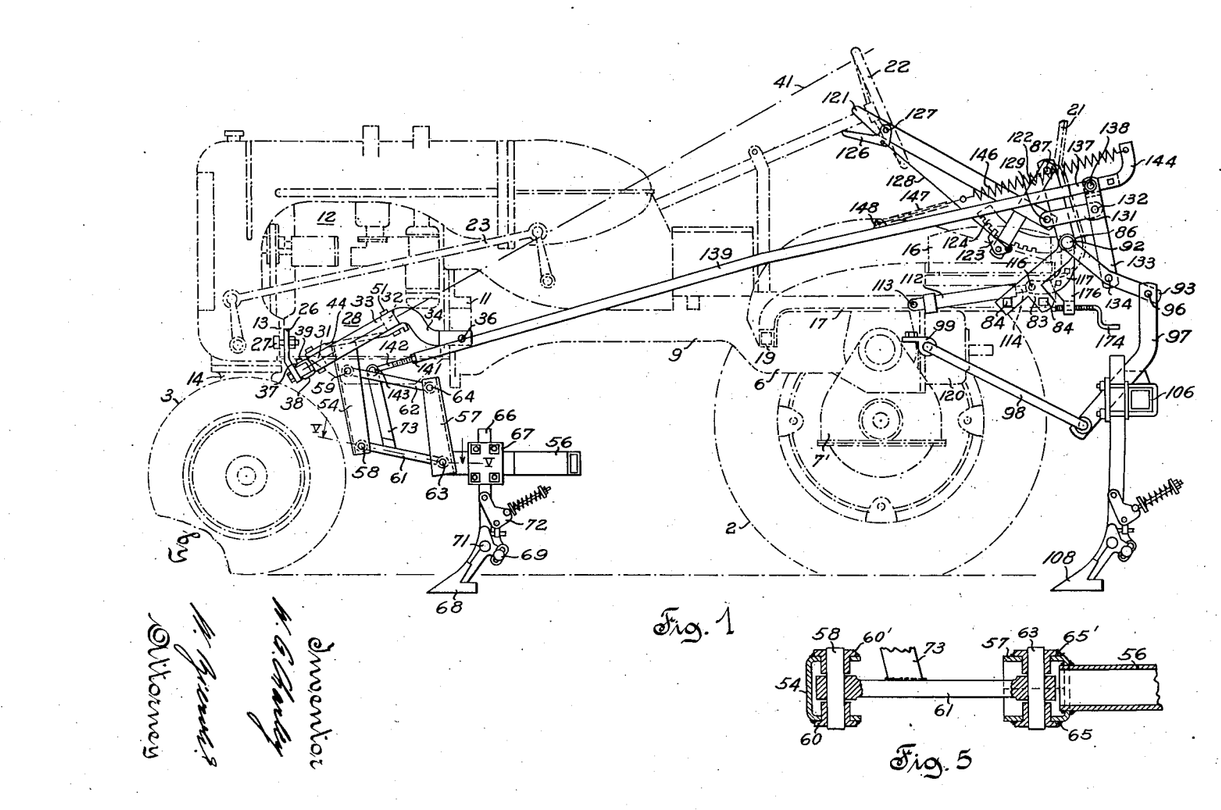
Fig. 1 is a side view of a tractor and cultivator mounted thereon, showing the cultivator adjusted to an operative position, the near rear wheel of the tractor being omitted to expose rear connections of the cultivator with the tractor.
Fig. 5 is an enlarged section on line V—V of Fig. 1.

A strap 34, adjacent to the engine 12 as shown in Fig. 2, has an upper portion in rear of and above the forward bar 31 and a lower portion laterally abutting the mounting pad 11 of the tractor to which it is secured by a cap screw 36. The forward end of the strap is rigidly secured, as by welding, to the inner end of the forward bar 31 independently of the outrigger bar 24. Another square tubular bar 32, to be referred to as a rearward bar or rear cross-bar, is rigidly secured, as by welding, to the upper portion of the strap 34, and the rearward bar 32 extends parallel to the forward bar 31. The dash-dotted line 41 in Fig. 1 indicates a line of vision on which the rearward bar 32 may be viewed by an operator occupying a normal upright position on the seat 16, the line 41 intersecting a vertical plane through the common axis of the rear wheels 1 and 2 at a point substantially above the rear axle structure of the tractor. It will be noted that the forward bar 31 is located on the tractor at an elevation above the ground sufficient to clear knee-high corn, and that the dash-dotted line 41 also intersects the axis of the forward bar 31. In other words, the rearward bar 32 is secured to the tractor, by means including a connection at 36 between the lower portion of the strap or supporting element 34 and an intermediate portion of the tractor between its rear axle structure and its forward portion which has the mentioned cantilever connection with the forward bar 31, in a plane coinciding or substantially coinciding with the axis of the forward bar 31 and with a line of vision through a point above the rear axle structure, on which line the rearward bar 32 may be viewed by an operator occupying a normal upright position on the tractor behind the bars 31 and 32. Due to this construction the rear axle structure of the tractor is substantially eliminated from the field of vision which the operator wants to observe when driving the tractor, and in which field of vision cultivating tools are arranged as shown in Fig. 1 and as will be described hereinbelow; and the obstruction of the operator's vision by the forward and rearward bars 31 and 32 is reduced to a minimum.

In the embodiment of the invention shown in the drawings the forward and rearward bars 31, 32 are part of a unitary attachment frame or draft transmitting structure, at the left side of the tractor, which may be readily installed on the tractor. Generally stated, the draft transmitting structure comprising the forward and rearward bars 31, 32 the plate member 33 and the strap 34, is of substantial width transversely of its length, and it is secured to the body of the tractor or traveling support in advance and independently of the rear axle structure, and the draft transmitting structure is constructed and arranged so as to extend, in the direction of its length (corresponding to the longitudinal direction of the bars 31, 32), transversely of the tractor body and, in the direction of its width (corresponding to a connecting line between the bars 31, 32 at right angles to their axes), in a plane substantially coinciding with a line of vision through a point above the rear axle structure of the tractor, on which line the draft transmitting structure may be viewed by an operator occupying a normal upright position on the tractor rearwardly of the draft transmitting structure. The obstruction of the operator's vision by the draft transmitting structure is thus reduced to a minimum and the rear axle structure is eliminated from the field of vision which the operator wants to observe, as pointed out hereinbefore.

The draft frame 29 at the right side of the tractor is constructed and arranged in the same manner as has just been described in connection with the draft frame 28, that is, the draft frame 29 comprises a pair of square tubular draft bars 42, 43, as shown in Fig. 2, which extend transversely of the tractor and are offset relative to each other so that a plane through their axes will coincide with the line 41. An angle clip 37' corresponding to the angle clip 37, and a U-clip 38', corresponding to the U-clip 38, connect the draft frame 29 to the cross-bar 24 at the right side of the tractor, and a strap 34', corresponding to the strap 34, is bolted to the mounting pad 11 at the right side of the tractor at 36'.

A pair of plate members 44, 46 extend between the draft bars 31 and 32 of the draft frame 28, each plate member having a flat rearward portion underlying the draft bar 32 and a flat forward portion overlying the draft bar 31. A hole in the forward portion of the plate member 44 registers with one of a series of holes 47 in the draft bar 31, and another hole in the rearward portion of the plate member 44 registers with one of a series of holes 48 in the draft bar 32. The plate member 44 is secured to the draft bar 31 by a screw bolt 49 extending through the mentioned forward hole of the plate member and the registering hole in the draft bar 31, and another bolt 51 extends through the hole in the rearward portion of the plate member 44 and through the registering hole in the draft bar 32 to secure the plate member 44 in fixed position on the draft frame 28. The position of the plate member 44 longitudinally of the draft frame 28 may be adjusted by removing the bolts 49 and 51 and reinserting them into any selected pair of holes in the draft bars 31 and 32. In order to provide for a finer adjustment of the plate member 44 than is afforded by the spacing of the holes 47 from each other and of the holes 48 from each other, the plate member 44 may have a second hole 50 in its forward portion and a second hole 50' in its rearward portion, the spacing of the holes at 49 and 50 in the forward portion of the plate member being shorter than the spacing of the holes 47 in the draft bar 31, and the spacing of the holes at 50' and 51 in the rearward portion of the plate member being likewise shorter than the spacing of the holes 48 in the draft bar 32. The provision of the additional holes 50 and 50' in the plate member 44 permits a vernier adjustment of the plate member 44 on the draft frame 28.

The second plate member 46 on the draft frame 28 is mounted in the same manner as has just been described in connection with the plate member 44, and a pair of bolts corresponding to the bolts 49 and 51 secure the plate member 46 to the draft bars 31 and 32 and permit vernier adjustment of the plate member 46 longitudinally of the draft frame 28.

Another pair of plate members 52, 53 are adjustably mounted on the draft frame 29 in the manner explained hereinbefore in connection with the plate members 44, 46 of the draft frame 28, the draft bars 42 and 43 having longitudinal series of holes 47' and 48', respectively.

It will be noted that the plate members on the draft frames and their bolt connections with the draft bars take up very little space transversely of the forwardly and downwardly inclined plane of each draft frame, which is desirable in order to clear the operator's vision.

Referring to Fig. 2, each of the plate members 44, 46 and 53, 52 has an oblong elevated portion 55 which is formed by pressing the plate members in a set of dies for the purpose of increasing the bending strength of the plate members. A bracket 54 is secured to the plate member 44, as shown in Fig. 1, in a depending position forwardly of the elevated rear end of the draft frame 28, preferably by welding. The bracket 54 is formed by bending a plate metal blank into U-shape, as shown in Fig. 5, to provide a pair of side flanges which are spaced from each other transversely of the tractor and are connected by a web portion at the forward side of the bracket 54. The plate member 46 has a depending bracket similar to the bracket 54 between the forward and rearward draft bars 31, 32, and each of the plate members 52, 53 also has a depending bracket, corresponding to the bracket 54, between the draft bars 42, 43.

Referring to Fig. 1, a tool support comprises a rig beam 56 and a bracket 57 secured to the forward end of the rig beam 56 in an upstanding position, preferably by welding. The bracket 57 is formed, like the bracket 54, by bending a plate metal blank into U-shape to provide a pair of side flanges which are spaced transversely of the tractor and connected by a web at the rear side of the bracket 57.

Referring to Fig. 5, a pair of hardened steel bushings 60 and 60' are mounted in a pair of substantially alined holes in the side flanges of the bracket 54 at the lower end of the latter, the bushings having annular shoulders bearing against the outer sides of the bracket and being securely held in place, preferably by fillet welds between the shoulders and the side flanges of the bracket. A lower draft link 61 is mounted between the side flanges of the bracket 54 by means of a hardened steel pin 58 which is journaled in the bushings 60 and 60' and has a close running fit therein. The link 61 is made from a blank of round bar stock by upsetting the ends of the blank to form an eye on each end of the link, the pin 58 being press-fitted into the eye at the forward end of the link, and the eye being of such thickness as to fit closely but freely between the relatively opposed end faces of the bushings 60 and 60'.

Another pair of hardened steel bushings 65 and 65' are mounted in substantially alined holes of the side flanges of the bracket 57 near the lower end of the latter, the bushings 65 and 65' being exact duplicates of the bushings 60 and 60' and secured to the bracket 57 in the same manner as has been described hereinbefore in connection with the bushings 60 and 60'. A hardened steel pin 63 which is an exact duplicate of the pin 58 is journaled in the bushings 65 and 65' and press-fitted into the eye at the rear end of the link 61 which closely but freely fits between the relatively opposed end faces of the bushings 65 and 65'. An upper draft link 62 (Fig. 1) connects the upper end of the bracket 57 with an upper portion of the depending bracket 54 in the same manner as has been explained hereinbefore in connection with the lower draft link 61. The upper draft link 62 is an exact duplicate of the draft link 61 and it is mounted on the brackets 54 and 57 by pivot pins 59 and 64 which are exact duplicates of the pivot pins 58 and 63, the pins 59 and 64 being journaled in hardened steel bushings the same as the bushings 60, 60' and 65, 65'. For purposes of definition, the pins 58 and 59 may be referred to as a pair of draft pivots, and the pins 63 and 64 may be referred to as a pair of coupling pivots.

The bracket 57 is thus connected with the bracket 54 for free up and down movement relative to the latter. The upper and lower links 61, 62 are spaced a substantial distance vertically from each other, as shown in Fig. 1, and they cooperate not only to guide the bracket 57 up and down relative to the bracket 54 but they also cooperate to stabilize the bracket 57 against tilting transversely of the vertical plane in which the bracket 57 moves up and down relative to the bracket 54. The links are capable of performing this stabilizing function efficiently due to the substantial mounting of the pins 58, 59, 63, 64 on the brackets 54 and 57 and due to the substantial vertical spacing of the links from each other. It will also be noted that the links 61 and 62 are of considerable length compared with the diameter of the bar stock from which they are made, and if in the operation of the cultivator an excessive lateral thrust force should act upon a tool or tools which are mounted on the rig beam 56, as explained hereinbelow, the inherent bending and torsional resiliency of the links will permit the bracket 57 to move sidewise to some extent in a substantially horizontal direction, and under slight lateral tilting of the bracket 57, without causing a permanent distortion of the links. Both links 61 and 62 are made of the same bar stock, and each link is elastically deflectable under torsional and bending loads transmitted thereto at its end remote from its respective draft pivot. That is, the link 61 is elastically deflectable under torsional and bending loads transmitted thereto at its rear end through the coupling pivot 63 and taken up on the bracket 54 by the draft pivot 58, and the link 62 is elastically deflectable under torsional and bending loads transmitted thereto at its rear end through the coupling pivot 64 and taken up on the bracket 54 by the draft pivot 59. Specifically, both links are similarly constructed and proportioned so as to have substantially the same deflection characteristics under said loads. As a result, a tool on the rig beam 56 will be normally retained in a plane at right angles to the axes of the draft pivots 58, 59, and the links 61, 62 may yield elastically, when said tool encounters an obstruction subjecting it to excessive thrust transversely of said plane, to permit said tool to clear said obstruction.

Figure 4:
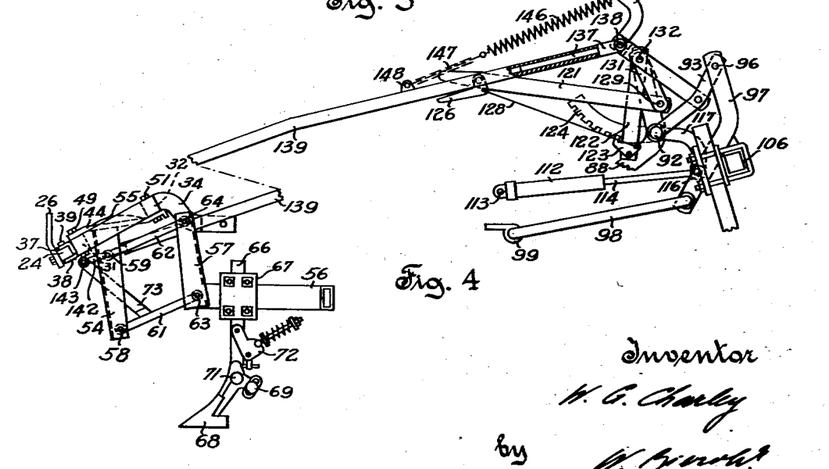
Fig. 4 is a schematic view showing the front frame of the cultivator and associated parts at a reduced horizontal spacing from the rear part of the cultivator, but at the same vertical spacing from said rear part as in Fig. 2, the schematic view illustrating the cultivator in the inoperative position to which it may be adjusted on the tractor.

The spacing between the pivot centers 63 and 64 on the bracket 57 is a trifle longer than the spacing between the pivot centers 58 and 59 on the bracket 54, the purpose being to compensate for a slight backward tilting movement of the bracket 57, in the raised position of the cultivator, due to the very limited radial play of the pins 58, 59, 63 and 64 in their respective bushings. As a result, the rig beam 56 which is connected with the bracket 57 will extend in a horizontal direction when the cultivator is adjusted to its raised or inoperative position, as shown in Fig. 4.

A tool shank 66 is secured to the rig beam 56 by a clamping device 67 permitting vertical adjustment of the tool shank 66 on the rig beam 56, and a cultivating shovel 68 is mounted on the lower end of the tool shank 66 in the usual manner by an adjustable connection 69 permitting pivotal adjustment of the cultivating shovel about a pivot center 71 to vary the suction of the cultivating shovel 68. The shovel 68 is releasably held in its operative position on the tool shank 66 by a spring trip mechanism 72 of conventional construction.

Secured to the lower link 61 between the brackets 54 and 57 is an arm 73 which extends upwardly from the lower link and is offset towards the tractor to permit movement of the arm past the bracket 54 in a forward direction about the pivot center 58. The arm terminates at its upper end below the draft frame 28 at such a distance therefrom that it may clear the forward draft bar 31 when swung forwardly as shown in Fig. 4.

Referring to Fig. 2, the rig beam 56 has a forward portion extending longitudinally of the tractor and a rearward portion at an angle relative to the forward portion, extending rearwardly and away from the tractor, the rearward portion affording a section for mounting another cultivating shovel (not shown) in laterally offset relation to the cultivating shovel 68. Another tool support comprising a rig beam 74 is connected with the depending bracket of the plate member 46 in the same manner as has been described hereinbefore in connection with the tool support 56, 57. The rig beam 74 is similar to the rig beam 56, but angled in the opposite direction so that the rear portion of the rig beam 74 extends rearwardly towards the tractor. A cultivating shovel 76 is mounted on the forward portion of the rig beam 74 in the same manner as the cultivating shovel 68 is mounted on the rig beam 56, and the tool support carrying the shovel 76 may be raised and lowered in the same manner as the tool support carrying the shovel 68, that is, by means of an arm 77 (Fig. 2) secured to the lower one of the parallel links which are pivoted on the depending bracket of the plate member 46.

The spacing between the plate members 44, 46 on the draft frame 28 is such as to permit the shovels 68 and 76 to travel at opposite sides of a plant row extending longitudinally of the tractor, and the shovels 68 and 76 may conveniently be adjusted to work closer to or farther away from such plant row by the described adjustment of the plate members 44, 46 on the draft frame 28.

Another pair of rig beams 78, 79 corresponding to the rig beams 56 and 74 are arranged at the other side of the tractor and connected with the depending brackets of the plate members 52 and 53, respectively, in the same manner as has been described hereinbefore in connection with the mounting of the rig beams 56 and 74 on the draft frame 28. That is, the rig beams 78, 79 may be raised and lowered by fore and aft movement of arms 81, 82 about lower pivot centers on the brackets depending from the plate members 52 and 53.

Referring to the rear part of the cultivator, which is mounted at the rear of the tractor, a stationary bracket 83 is secured to the left frame bar 17 by a pair of bolts 84, the bracket having a bearing boss 86 (Fig. 3) and extending upwardly beyond the bearing boss 86 to provide a pivot center at 87. Another stationary bracket 88, corresponding to the bracket 83, is secured to the frame bar 18 at the right side of the trac-
tor and has a bearing boss 89 in alinement with the bearing boss 86 of the bracket 83. The bracket 88 extends upwardly beyond the bearing boss 89 to provide a pivot center at 91 (Fig. 3) corresponding to the pivot center 87 on the bracket 83. Rotatably mounted in the bearing bosses 86, 89 is a rock shaft 92 which has a rock arm 93 on its outer end at the left side of the tractor and a rock arm 94 at the right side of the tractor. Pivoted on the outer end of the arm 93 at 96 (Fig. 1) is a bent strap 97 and a link 98 extends bewteen the lower end of the strap 97 and a bracket 99 on the tractor. The arm 93 and the link 98 cooperate to guide the strap 97 for up and down movement relative to the tractor.

The arm 94 at the right end of the rock shaft 92 extends in the same direction as the arm 93, and another strap 101 (Fig. 3), corresponding to the strap 97, is pivoted on the arm 94 at 102 and connected at its lower end with a bracket 103 on the tractor by a link 104 (Fig. 2) corresponding to the link 98. The straps 97 and 101 carry a transverse beam 106 which has a pair of gusset plates 107 welded thereto adjacent to the straps 97 and 101, the gusset plates being rigidly secured, respectively, to the straps 97 and 101. The transverse beam 106 carries a pair of track eradicating tools, 108, 109 behind the rear wheels 1 and 2, respectively, of the tractor, and a third track eradicating tool 111 in position to loosen the soil on the track of the front wheels 3 and 4 of the tractor.

Figure 3:
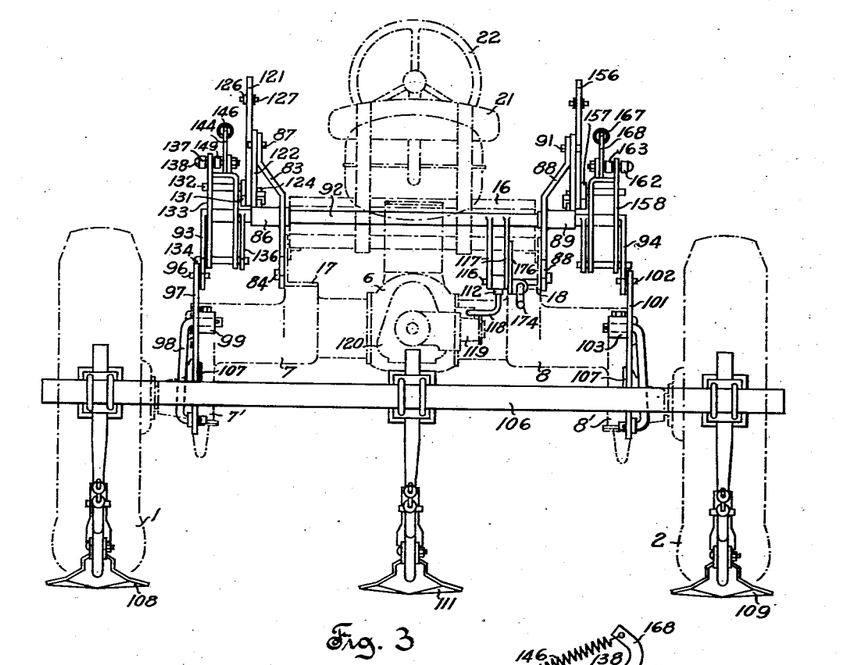
Fig. 3 is a rear view of the machine shown in Fig. 1.

Figs. 1 and 3 show the track eradicating tools in an operative position, and a one-way actuating mechanism is provided for raising the track eradicating tools from their operative to inoperative position. The one-way actuating mechanism comprises a hydraulic cylinder 112 which is pivoted on a pin 113 (Fig. 2) welded to the lower flange of the frame bar 18. A plunger 114 cooperating with the hydraulic cylinder 112 is pivotally connected at 116 to a pair of arms 117 on the rock shaft 92. The hydraulic cylinder 112 is connected by a hose 118 with a pump mechanism 119 mounted at the rear of the tractor and operable by the engine 12. The pump mechanism 119 is attached to a power take-off housing 120 enclosing suitable drive mechanism for the pump. A control mechanism, not shown, is incorporated in the pump mechanism, which permits, first, delivery of pressure fluid from the pump into the cylinder 112 to cause movement of the plunger 114 from the position in which it is shown in Figs. 1 and 2, to the position shown in Fig. 4, the latter position being reached by a full power stroke of the plunger 114; second, to stop delivery of pressure fluid to the cylinder 112 upon completion of the power stroke of the plunger 114, and at the same time to lock or entrap the pressure fluid in the cylinder 112, which prevents return movement of the plunger from the position in which it is shown in Fig. 4 to the position in which it is shown in Figs. 1 and 2; and third, to release the entrapped fluid in the cylinder 112, which permits return movement of the plunger 114 from the position in which it is shown in Fig. 4 to the position in which it is shown in Fig. 1. The valve mechanism is also such as to permit the pump mechanism to idle while the plunger 114 is in the position of Figs. 1 and 2, and during such idling movement of the pump no pressure fluid is effective in the cylinder 112 to prevent outward movement of the plunger 114. Admission of pressure fluid into the cylinder 112 causes the plunger 114 to rotate the rock shaft 92 in an anticlockwise direction with reference to Fig. 1. Such anticlockwise rotation of the rock shaft causes the arms 93, 94 to lift the transverse beam 106 until the plunger 114 reaches the end of its travel, whereupon the control mechanism may be operated to stop delivery of pressure fluid to the cylinder 112 and to entrap the pressure fluid in the cylinder so as to hold the transverse beam 106 in its elevated position. Fig. 4 shows the position to which the arm 93 of the rock shaft 92 will be moved by a full stroke of the plunger 114, and the corresponding lifted position of the transverse beam 106, the transverse beam 106 being moved into said position by simultaneous upward movement of the arms 93 and 94.

The bracket 83 at the left side of the tractor has an upwardly extending portion affording a pivot center 87, as has been stated hereinbefore, and swingable on the pivot center 87 is a hand lever comprising a handle bar 121 and a crossbar 122 which is welded to the handle bar 121 and pivoted to the bracket 83 at the pivot center 87. A latch 123 is pivoted on the free end of the cross bar 122, and a notched segment 124 engageable by the latch 123 is secured in a fixed position on the bearing boss 86 of the bracket 83. The latch 123 is held by a suitable spring (not shown) in engagement with the notched segment 124 and may be released manually by means of a grip lever 126 which is pivoted on the handle bar 121, at 127, and connected with the latch 123 by a heavy wire 128. Pivoted on the rear end of the handle bar 121 at a pivot center 129 is a first link 131 which has a second pivot center 132 at a distance from the pivot center 129 equal to the spacing of the pivot center 129 from the pivot center 87. Pivotally connected with the first link 131 at the pivot center 132 is a second link 133 which has a pivotal connection with the arm 93 at a pivot center 134. Referring to Fig. 3, it will be seen that the second link 133 has a relatively long arm adjacent to the arm 93 of the rock shaft 92 and a shorter arm adjacent to a second arm 136 of the rock shaft 92, a pin extending through the arms 93 and 136 of the rock shaft and through the arms of the second link 133, affording the pivotal connection 134. Another pin extending through both arms of the link 133 affords the pivot center 132 on which the first link 131 is connected with the second link 133.

The outer arm of the second link 133 extends beyond the pivot center 132, and a shoulder pin 137, best shown in Fig. 4, is pivotally connected to the upper end of the second link 133 by means of a pivot pin 138. A tubular rod 139 is telescopically slidable, at its rear end, on the shoulder pin 137, and welded to the forward end of the tubular rod 139 is a nut 141. An eye-bolt 142 is threaded into the nut 141 and pivotally connected at its eye with the upper end of the arm 73 on the lower draft link 61 by means of a pivot pin 143. Referring again to the second link 133 at the rear end of the cultivator, a rearwardly and upwardly extending bracket arm 144 is rigidly secured to the second link 133, and a coil spring 146 is hooked at one end into an eye at the upper end of the bracket arm 144. The other end of the spring 146 has a chain connection 147 with a lug 148 on the tubular rod 139.

Pivoted on the pin 138 is another shoulder pin 149 (Fig. 2) corresponding to the shoulder pin 137, and a second tubular rod 151 is telescopically movable at its rear end on the shoulder pin 149. The second tubular rod 151 is connected at its forward end with the arm 77 of the lower draft link for the rig beam 74 in the same manner as has been described in connection with the rod 139, that is, an eye-bolt 152 is screwed into a nut at the forward end of the rod 151 and pivotally connected with the arm of the lower draft link for the rig beam 74. The forward end of the spring 146 has a chain connection 153 with a lug 154 on the rod 151, as shown in Fig. 2.

The tool supports at the right side of the tractor comprising the rig beams 78, 79 are operatively connected with the rock shaft 92 by a mechanism which is a duplicate of the mechanism at the left side of the tractor, which has been described hereinbefore, the mechanism at the right side, however, being arranged opposite hand relative to the mechanism at the left side, as may be seen from Figs. 2 and 3. The mechanism at the right side of the tractor comprises a handle bar 156 corresponding to the handle bar 121, the handle bar 156 being swingable about the mentioned pivot center 91 on the bracket 88 at the right side of the tractor and operatively connected with the rock shaft 92 by a first link 157 and second link 158, corresponding to the first link 131 and second link 133. A pair of tubular rods 159, 161 are pivotally and slidably connected with the second link 158 at the right side of the tractor by means of shoulder pins 162, 163 corresponding to the shoulder pins 137 and 149. Eye-bolts 164, 166 adjustably connect the rods 159, 161 with the arms 81, 82 of the lower draft links for the rig beams 78 and 79. A spring 167 is hooked, at its rear end, into a bracket 168 (Fig. 3) on the second link 158 at the right side of the tractor, and a pair of chains 169, 171 connect the spring 167 with lugs 172, 173 on the rods 159, 161, respectively.

It will be noted that the rod 139 and eye bolt 142 constitute a reciprocable member which is sustained on a rearward portion of the tractor in an elevated position relative to the draft frame 28, the rear end of the rod 139 being sustained on the link 133 by means of the shoulder pin 137, and the link 133, as shown in Fig. 1, being restrained from swinging movement about its pivotal connection 134 with the rock arm 93 by the link 131 and hand lever 121, 122 which is normally locked on the segment 124. The reciprocable member 139, 142 extends forwardly and downwardly under the draft frame, and when the rock arm 93 is swung upwardly from the position in which it is shown in Fig. 1, by admission of pressure fluid into the cylinder 112, as has been mentioned hereinbefore, the reciprocable member 139, 142 is pushed forwardly and, as a result, the forward outer implement unit at the left side of the tractor is raised from its operative to an inoperative position, as indicated in Fig. 4. During the mentioned upward swinging movement of the rock arm 93 the pivot point at 134 travels on an arc about the axis of the rock shaft 92, and the pivot point at 132 travels on an arc about the pivot center 129, and the link 133 moves from the position shown in Fig. 1 to that shown in Fig. 4. The pivot center 138 on the link 133 is thereby moved on a path of predetermined curvature causing the mentioned forward push upon the reciprocable member 139, 142.

The rod 151 and eye bolt 152 (see Fig. 2) are similarly pushed forwardly by upward swinging movement of the rock arm 93, and as a result the inner forward implement unit at the left side of the tractor is raised from its operative to an inoperative position simultaneously with the outer forward implement unit at the left side of the tractor. The inner and outer forward implement units at the right side of the tractor, are raised by forward movement of the rods 159 and 161 which are connected with the rearward rock arm 94 in the same manner as has been explained hereinbefore in connection with the rock arm 93 and rods 139, 151. Both rock arms 93 and 94 are rigidly secured to the shaft 92, as stated, and the inner and outer forward implement units at the right side of the tractor will therefore be raised simultaneously with the inner and outer forward implement units at the left side of tractor by admission of pressure fluid into the cylinder 112.

In the raised position to which the forward implement units are moved by a full power stroke of the plunger 114 the upper and lower draft links of all forward implement units assume the position illustrated in Fig. 4 for the lower and upper draft links 61 and 62, and in which position the upper links extend substantially parallel to the forwardly and downwardly inclined plane coinciding with the line 41, in which plane the draft frames 28 and 29 extend, as has been explained hereinbefore. Sufficient clearance is provided under the draft frames 28 and 29 to permit the upper links to assume the mentioned positions substantially parallel to the draft frames.

In the inoperative position of the cultivator, as shown in Fig. 4, the weight of the implement unit connected with the bracket 54 tends to swing the arm 73 in a rearward direction resulting in a backward push upon the tubular rod 139, and the tubular rods 151, 159 and 161 are similarly subjected to a rearward push in the raised position of the implement due to the weight of the forward implement units connected with said rods. The rearward push acting upon the rods 139 and 151 in the raised position of the cultivator, due to the weight of the forward implement units at the left side of the tractor, is transmitted in part through the second link 133 to the rock arm 93, and in part through the second link 133, the first link 131, handle bar 121 and cross-bar 122 to the pivot center 87 on the bracket 83 which is fixed on the tractor. Similarly, the rearward push acting upon the rods 159 and 161 in the raised position of the cultivator, due to the weight of the forward implement units at the right side of the tractor, is transmitted in part through the second link 158 to the rock arm 94, and in part through the link 157, handle bar 156 and its cross-arm to the bracket 88 on the tractor. The weight components of the forward implement units at the left and right sides of the tractor, which are transmitted to the rock shaft 92 through the links 133 and 158 in the raised position of the cultivator tend to rotate the rock shaft 92 in a clockwise direction as viewed in Fig. 4, and the weight of the rearward implement unit comprising the transverse beam 106 and track eradicating tools 108, 109, 111 also tends to rotate the rock shaft 92 in clockwise direction as viewed in Fig. 4.

The weight of all forward implement units and the weight of the entire rear implement unit will therefore cooperate to produce a torque upon the rock shaft 92 in a clockwise direction, as viewed in Fig. 1, which torque will become effective to rotate the rock shaft, upon release of the fluid which is entrapped in the cylinder 112 in order to hold the forward and rearward implement units in their inoperative position. The clockwise rotation of the rock shaft 92 will continue until a crank screw 174 which is mounted in a bracket 176 on one of the arms 117 of the rock shaft engages a fixed abutment on the right frame bar 18 on the tractor.

The reciprocable member 139, 142 connected with the arm 73, and the other reciprocable members comprising the rods 151, 159, 161 and eye bolts 152, 164 and 166 are thus moved rearwardly upon release of the pressure fluid which is entrapped in the cylinder 112 in order to hold all forward implement units and the rearward implement unit in their raised positions.

Referring again to Fig. 1, it will be noted that the reciprocable member 139, 142 may also be moved back and forth by adjustment of the hand lever 121, 122 about the pivot center 87, while the rock arm 93 is in the position shown in Fig. 1. When the hand lever is moved downwardly from the position in which it is shown in Fig. 1 the link 133 is swung rearwardly about the pivot center 134 and as a result rearward pull is transmitted to the rod 139 through the spring 146 and chain 147. On the other hand, when the hand lever 121, 122 is moved upwardly from the position in which it is shown in Fig. 1, the link 133 is swung forwardly about the pivot center 134 and as a result forward push is transmitted to the rod 139 through the shoulder pin 137. The forward outer implement unit at the left side of the tractor may thus be adjusted up and down by manipulation of the hand lever 121, 122, while the rock arm 93 is in its implement lowered position, and it will be noted that the depth of soil penetration of the track eradicating tools 108, 109 and 111 is not affected by adjustment of the hand lever.

When the hand lever 121, 122 is moved upwardly from the position in which it is shown in Fig. 1, forward push is also transmitted to the reciprocable member comprising the rod 151 and eye bolt 152, and the inner forward implement unit at the left side of the tractor will therefore be raised simultaneously with the adjacent outer implement unit by said upward movement of the hand lever. Similarly, when the hand lever is swung downwardly, the resulting rearward pull on the spring 146 is transmitted to the rod 151 through the chain 153.

The hand lever 156 at the right side of the tractor may be manipulated to move the rods 159 and 161 back and forth for lowering and raising the inner and outer forward implement units at the right side of the tractor, and the explanations given hereinbefore with reference to the hand lever 121, 122 similarly apply to the hand lever 156.

Features of the implement raising and lowering mechanism at the rear end of the tractor herein disclosed but not claimed are claimed in a divisional application Serial Number 472,671, filed January 18, 1943, now Patent No. 2,350,588, issued June 6, 1944, and also in a copending application Serial Number 407,032, filed August 15, 1941 by W. G. Charley and A. G. Buhr for Agricultural machine, now Patent No. 2,350,587, issued June 6, 1944.

While in the foregoing a preferred embodiment of the invention has been described with reference to the drawings, it should be understood that it is not intended to limit the invention to the exact details of construction herein shown and described for various modifications within the scope of the appended claims may occur to persons skilled in art.

It is claimed and desired to secure by Letters Patent:

1. In an agricultural implement, a traveling support, a draft transmitting structure of substantial width transversely of its length secured to said traveling support so as to extend, in the direction of its length, transversely of said traveling support and, in the direction of its width, at an acute angle relative to the ground level, a bracket secured to said draft transmitting structure in a depending position remote from the elevated end of the latter, a tool support, means connecting said tool support with said bracket for up and down movement of said tool support relative to said draft transmitting structure, said means including a link underlying said draft transmitting structure and swingable vertically about a pivot center on said bracket; and means for raising and lowering said tool support comprising an arm secured to said link, and a lengthwise reciprocable elongated member extending under said elevated end of said draft transmitting structure and pivotally connected with said arm.

2. In an agricultural implement, a traveling support, a draft transmitting structure of substantial width transversely of its length secured to said traveling support so as to extend, in the direction of its length, transversely of said traveling support and, in the direction of its width, at an acute angle relative to the ground level, a bracket secured to said draft transmitting structure in a depending position remote from the elevated end of the latter, a tool support, a pair of vertically spaced links underlying said draft transmitting structure and pivotally secured to said bracket and tool support to guide the latter for up and down movement relative to said draft transmitting structure, and means for raising and lowering said tool support comprising an arm secured to and extending upwardly from the lower one of said links, and a lengthwise reciprocable elongated member extending under said elevated end of said draft transmitting structure and pivotally connected with said arm.

3. In an agricultural implement, a traveling support, a draft transmitting structure of substantial width transversely of its length secured to said traveling support so as to extend, in the direction of its length, transversely of said traveling support and, in the direction of its width, in an acute angle position relative to the ground level, a bracket secured to said draft transmitting structure in a depending position remote from the elevated end of the latter, a tool support, a first link underlying said draft transmitting structure pivotally secured to said tool support and swingable about a pivot center on said bracket into an acute angle position relative to the ground substantially parallel to said acute angle position of said draft transmitting structure, a second link below said first link pivotally secured to said tool support and bracket and cooperating with said first link to guide said tool support for up and down movement relative to said draft transmitting structure, and means for raising and lowering said tool support comprising an arm secured to and extending upwardly from said second link, and a lengthwise reciprocable elongated member extending under said elevated end of said draft transmitting structure and pivotally connected with said arm.

4. In combination with a tractor, a unitary implement draft frame comprising a pair of relatively opposed forward and rearward bars in a common plane adapted to extend, in their longitudinal directions transversely of said tractor, detachable connecting means securing said draft frame on said tractor in a position in which said common plane of said bars is forwardly and downwardly inclined at such an angle as to coincide substantially with a line of vision on which an operator occupying a normal upright position on said tractor in rear of said draft frame may view said rearward bar, a plurality of plate members each having flat forward and rearward portions secured, respectively, to said bars, brackets secured, respectively, to said plate members in depending positions between said bars, and ground engaging tools arranged to be drawn, respectively, by said brackets.

5. In combination with a tractor, a unitary implement draft frame comprising a pair of relatively opposed forward and rearward bars in a common plane adapted to extend, in their longitudinal directions transversely of said tractor, detachable connecting means securing said draft frame on said tractor in a position in which said common plane of said bars is forwardly and downwardly inclined at such an angle as to coincide substantially with a line of vision on which an operator occupying a normal upright position on said tractor in rear of said draft frame may view said rearward bar, a plurality of plate members each having a flat rearward portion underlying said rearward bar and a flat forward portion overlying the said forward bar, bolts extending through said bars, respectively, and through said relatively flat forward and rearward portions of said plate members for securing the latter on said draft frame; brackets secured, respectively, to said plate members in depending positions between said bars, and ground engaging tools arranged to be drawn, respectively, by said brackets.

6. In combination with a tractor, a unitary implement draft frame comprising a pair of relatively opposed forward and rearward bars in a common plane adapted to extend, in their longitudinal directions transversely of said tractor, detachable connecting means securing said draft frame on said tractor in a position in which said common plane of said bars is forwardly and downwardly inclined at such an angle as to coincide substantially with a line of vision on which an operator occupying a normal upright position on said tractor rearwardly of said draft frame may view said rearward bar, a plurality of plate members extending transversely of said bars and each having a pair of bolt holes one adjacent to a longitudinal series of bolt holes in said forward bar and the other adjacent to a longitudinal series of bolt holes in said rearward bar, screw bolts selectively insertible into the bolt holes of said bars and passing through said plate members, for securing said plate members at various spacings from each other to said draft frame, brackets secured, respectively, to said plate members in depending positions between said bars, and ground engaging tools arranged to be drawn, respectively, by said brackets.

7. In combination with a tractor, an implement draft frame of substantial width transversely of its length secured to a forward portion of said tractor so as to extend, in the direction of its length, transversely of said tractor and, in the direction of its width, in a forwardly and downwardly inclined plane, a ground engaging tool, a support for said tool, draft means connecting said tool support with said draft frame; said draft means comprising a bracket mounted on said draft frame in a depending position forwardly of the elevated rear end of the latter, a pair of vertically spaced links underlying said draft frame and pivotally secured to said bracket and tool support for guiding the latter to different levels vertically relative to said draft frame; and raising and lowering means for said tool support comprising an arm secured to one of said links, a reciprocable member sustained on a rearward portion of the tractor in an elevated position relative to said draft frame and extending forwardly and downwardly under said draft frame, said member being operatively connected, at its forward end, with said arm, for raising and lowering said tool support by lengthwise movement of said member, and means for reciprocating said member.

8. In an agricultural machine, a traveling support, a ground engaging tool, and a twin link suspension for said tool comprising, a stationary channel shaped bracket on said traveling support, a first pair of axially alined bushings mounted in opposite side flanges of said stationary bracket at an upper portion thereof, and a second pair of axially alined bushings mounted in said side flanges of said stationary bracket at a lower portion thereof, a movable support for said tool including a second channel shaped bracket, a third pair of axially alined bushings mounted in opposite side flanges of said second bracket at an upper portion thereof, a fourth pair of axially alined bushings mounted in said opposite side flanges of said second bracket at a lower portion thereof, an upper link, journals rigidly connected with said upper link at one end thereof and rotatably mounted in said first pair of bushings at opposite sides of said upper link, journals rigidly connected with said upper link at the other end thereof and rotatably mounted in said third pair of bushings, at opposite sides of said upper link, a lower link, journals rigidly connected with said lower link at one end thereof and rotatably mounted in said second pair of bushings, at opposite sides of said lower link, and journals rigidly connected with said lower link at the other end thereof and rotatably mounted in said fourth pair of bushings at opposite sides of said lower link.

9. In combination with a tractor having a rear axle structure, a pair of cross bars secured, one rearwardly of and above the other, to said tractor forwardly and independently of said rear axle structure, so as to extend transversely of said tractor in a common plane, the horizontal and vertical spacings of said bars being such that said common plane thereof substantially coincides with a line of vision through a point above said rear axle structure, on which said one bar may be viewed by an operator occupying a normal upright position on said tractor rearwardly of said bars, and implement supporting means mounted on said bars.

10. In an agricultural implement, a vehicle body, means including a rear axle structure supporting said body, and tool attaching means comprising a draft transmitting structure of substantial width transversely of its length, secured to said vehicle body in advance and independently of said rear axle structure and constructed and arranged so as to extend, in the direction of its length, transversely of said vehicle body and, in the direction of its width, in a forwardly and downwardly inclined plane substantially coinciding with a line of vision through a point above said rear axle structure, on which line said draft transmitting structure may be viewed by an operator occupying a normal upright position on said vehicle rearwardly of said draft transmitting structure.

11. In combination with a tractor having a rear axle structure, a front cross bar having a cantilever connection with said tractor at a forward portion thereof, a supporting element having an upper portion in rear of and above said front cross bar and a lower portion adapted to engage an intermediate portion of said tractor between said forward portion thereof and said rear axle structure, a rear cross bar secured to said upper portion of said supporting element, means including a connection between said lower portion of said supporting element and said intermediate portion of said tractor for securing said rear cross bar to said tractor in a plane substantially coinciding with the axis of said front cross bar and with a line of vision through a point above said rear axle structure, on which said rear cross bar may be viewed by an operator occupying a normal upright position on said tractor behind said bars, and implement supporting means mounted on said front and rear cross bars for adjustment transversely of said tractor.

12. In combination with a tractor having a rear axle structure, an attachment frame of substantial width transversely of its length, secured to said tractor in advance and independently of said rear axle structure and constructed and arranged so as to extend, in the direction of its length, transversely of said tractor and, in the direction of its width, in a forwardly and downwardly inclined plane substantially coinciding with a line of vision through a point above said rear axle structure, on which line said frame may be viewed by an operator occupying a normal upright position on said tractor rearwardly of said frame, a bracket structure secured to said frame having a depending portion below said plane, and upper and lower implement draft links pivoted on said depending portion of said bracket structure.

13. In combination with a tractor having a rear axle structure and an outrigger bar mounted on a forward portion thereof, a front cross bar detachably supported on said outrigger bar, a supporting element secured to said front cross bar independently of said outrigger bar and having a portion detachably secured to an intermediate portion of said tractor between said forward portion thereof and said rear axle structure, a rear cross bar secured to said supporting element rearwardly of and above said front cross bar in a plane substantially coinciding with the axis of said front cross bar and with a line of vision through a point above said rear axle structure, on which said rear cross bar may be viewed by an operator occupying a normal upright position on said tractor behind said cross bars, and implement supporting means mounted on said front and rear cross bars.

WALTER G. CHARLEY.